US011091067B2

(12) United States Patent
Line et al.

(10) Patent No.: US 11,091,067 B2
(45) Date of Patent: Aug. 17, 2021

(54) SEATING ASSEMBLY WITH FOLD FLAT SEATBACK

(71) Applicant: Ford Global Technologies, LLC, Dearborn, MI (US)

(72) Inventors: Johnathan Andrew Line, Northville, MI (US); Keith Allen Godin, Dearborn, MI (US); Sean Bayle West, Monroe, MI (US); Spencer Robert Hoernke, Dundas (CA); Macit Aktas, Windsor (CA); Deeptej Kudav, Southgate, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/735,091

(22) Filed: Jan. 6, 2020

(65) Prior Publication Data

US 2021/0206299 A1    Jul. 8, 2021

(51) Int. Cl.
| | |
|---|---|
| *B60N 2/22* | (2006.01) |
| *B60N 2/30* | (2006.01) |
| *B60N 2/20* | (2006.01) |
| *B60N 2/06* | (2006.01) |
| *B60N 2/68* | (2006.01) |

(52) U.S. Cl.
CPC ............ *B60N 2/2213* (2013.01); *B60N 2/06* (2013.01); *B60N 2/206* (2013.01); *B60N 2/2227* (2013.01); *B60N 2/682* (2013.01)

(58) Field of Classification Search
CPC .......... B60N 2/12; B60N 2/3011; B60N 2/06; B60N 2/10; B60N 2/02; B60N 2002/0212; B60N 2/206; B60N 2002/363
See application file for complete search history.

(56) References Cited

U.S. PATENT DOCUMENTS

| | | | |
|---|---|---|---|
| 5,482,349 A * | 1/1996 | Richter ................ | B60N 2/2352 296/65.09 |
| 6,513,875 B1 | 2/2003 | Gray et al. | |
| 6,536,843 B1 * | 3/2003 | Severinski .......... | B60N 2/3011 296/65.01 |
| 6,601,900 B1 * | 8/2003 | Seibold ................ | B60N 2/0292 296/65.05 |
| 6,733,076 B2 | 5/2004 | Grable et al. | |
| 6,860,562 B2 * | 3/2005 | Bonk ................. | B60N 2/01583 297/378.12 |
| 6,926,364 B2 | 8/2005 | Cooley et al. | |
| 7,255,399 B2 * | 8/2007 | White ................ | B60N 2/01583 297/378.12 |
| 7,311,358 B2 * | 12/2007 | White ................ | B60N 2/01525 297/284.9 |

(Continued)

*Primary Examiner* — Shin H Kim

(74) *Attorney, Agent, or Firm* — David Coppiellie; Price Heneveld LLP

(57) ABSTRACT

A vehicle seating assembly has a seat, a seatback and a bracket extending between the seat and the seatback with a first pivotable coupling between the bracket and the seat, a second pivotable coupling between the bracket and the seatback, and a sector gear portion with a gear assembly including a spur gear. The sector gear portion is disposed along an edge of the bracket, wherein the spur gear is rotatable to engage the sector gear portion of the bracket to move the bracket from a first position to a second position to move the second pivotable coupling from a primary position to a secondary position.

18 Claims, 14 Drawing Sheets

(56) References Cited

U.S. PATENT DOCUMENTS

| | | | | |
|---|---|---|---|---|
| 8,662,561 B2* | 3/2014 | Runde | B60N 2/3047 | 296/65.09 |
| 8,801,101 B2* | 8/2014 | Dagcioglu | B60N 2/3022 | 297/331 |
| 9,061,605 B2* | 6/2015 | Hurst | B60N 2/12 | |
| 9,254,761 B1* | 2/2016 | Aktas | B60N 2/366 | |
| 9,283,873 B2* | 3/2016 | Line | B60N 2/3065 | |
| 9,914,377 B2* | 3/2018 | Wagner | F16C 1/10 | |
| 9,944,204 B2* | 4/2018 | Salvia, III | B60N 2/305 | |
| 10,239,427 B2* | 3/2019 | Keyser | B60N 2/3009 | |
| 10,293,716 B2* | 5/2019 | Joshi | B60N 2/3011 | |
| 10,308,146 B1* | 6/2019 | Kish | B60N 2/12 | |
| 10,589,642 B2* | 3/2020 | Handigol | B60N 2/20 | |
| 10,618,444 B2* | 4/2020 | Kish | B60N 2/165 | |
| 2001/0040400 A1* | 11/2001 | Kamida | B60N 2/305 | 297/354.13 |
| 2002/0195857 A1* | 12/2002 | Ito | B60N 2/206 | 297/344.1 |
| 2004/0084946 A1* | 5/2004 | Bonk | B60N 2/305 | 297/378.14 |
| 2004/0124684 A1* | 7/2004 | Bonk | B60N 2/3011 | 297/378.12 |
| 2006/0061183 A1* | 3/2006 | White | B60N 2/986 | 297/378.12 |
| 2006/0091705 A1* | 5/2006 | White | B60N 2/36 | 297/6 |
| 2006/0131946 A1* | 6/2006 | Andrigo | B60N 2/2213 | 297/378.1 |
| 2006/0152058 A1* | 7/2006 | Pejathaya | B60N 2/3065 | 297/378.12 |
| 2009/0079248 A1* | 3/2009 | Keyser | B60N 2/0232 | 297/362.11 |
| 2010/0052390 A1* | 3/2010 | Dagcioglu | B60N 2/3031 | 297/324 |
| 2010/0084903 A1* | 4/2010 | Kammerer | B60N 2/0292 | 297/329 |
| 2011/0101752 A1* | 5/2011 | Deegener | B60N 2/2252 | 297/344.12 |
| 2011/0115273 A1* | 5/2011 | Epaud | B60N 2/3031 | 297/378.1 |
| 2011/0133534 A1* | 6/2011 | Ngiau | B60N 2/22 | 297/354.12 |
| 2011/0316317 A1* | 12/2011 | Sprenger | B60N 2/3065 | 297/344.1 |
| 2012/0161486 A1* | 6/2012 | Stojanovic | B60N 2/12 | 297/354.1 |
| 2013/0049425 A1* | 2/2013 | Runde | B60N 2/2209 | 297/354.12 |
| 2013/0214578 A1* | 8/2013 | Stilleke | B60N 2/2252 | 297/362 |
| 2013/0264853 A1* | 10/2013 | Romer | B60N 2/12 | 297/317 |
| 2013/0320729 A1* | 12/2013 | Cooley | B60N 2/065 | 297/331 |
| 2013/0341953 A1* | 12/2013 | White | B60N 2/3079 | 296/65.01 |
| 2015/0375643 A1* | 12/2015 | Fisher | B60N 2/015 | 297/334 |
| 2016/0318424 A1* | 11/2016 | Dlugokecki | B60N 2/12 | |
| 2017/0001546 A1* | 1/2017 | Keyser | B60N 2/2209 | |
| 2018/0111513 A1* | 4/2018 | Scott | B60N 2/22 | |
| 2018/0319293 A1* | 11/2018 | Joshi | B60N 2/3011 | |
| 2019/0016234 A1* | 1/2019 | Keyser | B60N 2/067 | |
| 2019/0143851 A1* | 5/2019 | Handigol | B60N 2/1615 | 297/341 |
| 2020/0376987 A1* | 12/2020 | Madhu | B60N 2/2236 | |
| 2020/0391621 A1* | 12/2020 | Jung | B60N 2/045 | |
| 2020/0406787 A1* | 12/2020 | Line | B60N 2/3011 | |

* cited by examiner

SEATING ASSEMBLY WITH FOLD FLAT SEATBACK

FIELD OF THE DISCLOSURE

The present disclosure relates to a vehicle seating assembly. More specifically, the present disclosure relates to a vehicle seating assembly that is positionable in various positions.

BACKGROUND OF THE DISCLOSURE

Vehicle seating assemblies may be arranged in various positions to enable a vehicle seating assembly to serve various functions in a vehicle.

SUMMARY OF THE DISCLOSURE

According to a first aspect of the present disclosure, a vehicle seating assembly has a seat, a seatback, and a bracket extending between the seat and the seatback with a first pivotable coupling between the bracket and the seat, a second pivotable coupling between the bracket and the seatback, and a sector gear portion with a gear assembly including a spur gear. The sector gear portion is disposed along an edge of the bracket, wherein the spur gear is rotatable to engage the sector gear portion of the bracket to move the bracket from a first position to a second position to move the second pivotable coupling from a primary position to a secondary position.

Embodiments of the first aspect of the disclosure can include any one or a combination of the following features:
- a mechanical lock is disposed through the bracket and securable to a seat frame, wherein the mechanical lock is positionable in an engaged position and in a disengaged position;
- when the mechanical lock is positioned in the engaged position, the bracket is negligibly rotatable about the first pivotable coupling;
- when the mechanical lock is positioned in the disengaged position, the bracket is rotatable about the first pivotable coupling between a first position of the bracket and a second position of the bracket;
- the mechanical lock includes a pin disposed through an opening in the bracket;
- when the bracket is in the first position and the second pivotable coupling is in the primary position, the seatback is positionable in a substantially upright position;
- when the bracket is in the second position and the second pivotable coupling is in the secondary position, the seatback is positionable in a forward inclined position;
- when the seatback is in the forward inclined position, the seatback may be rotated about the second pivotable coupling between a forward inclined position and a substantially flat position;
- in the substantially flat position, the seatback is disposed over the seat;
- the first pivotable coupling extends through a first end of the bracket and is secured to a seat frame, and the second pivotable coupling extends through a second end of the bracket and is secured to a seatback frame;
- the toothed interface between the spur gear and the sector gear portion defines a primary locking mechanism for retaining the bracket in the first position; and
- the mechanical lock defines a secondary locking mechanism for retaining the bracket in the first position.

According to a second aspect of the present disclosure, a vehicle seating assembly has a bracket extending along a side of a seat frame and includes a first pivotable coupling disposed between the bracket and the seat frame to define a first axis and a second pivotable coupling disposed between the bracket and a seatback frame to define a second axis. A list mechanism is disposed between a seat and a seatback for moving the bracket between a first position and a second position thereby moving the second pivotable coupling from a first height to a second height, wherein the seatback is movable between a forward inclined position and a substantially flat position when the second pivotable coupling is at the second height.

Embodiments of the second aspect of the disclosure can include any one or a combination of the following features:
- the lift mechanism includes a spur gear that rotates along a toothed portion disposed on the bracket to move the bracket between the first position and the second position;
- a locking mechanism for maintaining the bracket in the first position, wherein, when the locking mechanism is released, the spur gear is rotatable along the teeth disposed on the bracket to move the bracket from the first position to the second position;
- a forward portion of the seating assembly includes a mounting bracket and a B-bracket that define a third pivotable coupling about which the vehicle seating assembly is rotatable between a sitting position and a standing position;
- the mounting bracket is fixedly coupled to a rail slidable along a track assembly in the vehicle floor; and
- the locking mechanism includes a cable-actuated pin.

According to a third aspect of the present disclosure, a seating assembly having a seat, a setback, a first axis defined by a pivotable coupling between the bracket and the seat with a second axis defined by a pivotable coupling between the bracket and the seatback, and a third axis defined by a pivotable coupling between the seat frame and a mounting bracket proximate a floor. The bracket is rotatable about the first axis to move the seatback from a substantially upright position to a forward inclined position, wherein the seatback is rotatable around the second axis to move the seatback from a forward inclined position to a substantially flat position. The seating assembly is pivotable about the third axis to move the seating assembly from the sitting position to the standing position when the seatback is in the substantially upright position.

Embodiments of the third aspect of the disclosure can include the following feature:
- the mounting bracket is fixedly coupled to a rail disposed in a track assembly, wherein the rail is slidable in the track assembly.

These and other aspects, objects, and features of the present disclosure will be understood and appreciated by those skilled in the art upon studying the following specification, claims, and appended drawings.

DETAILED DESCRIPTION

Figure 1:
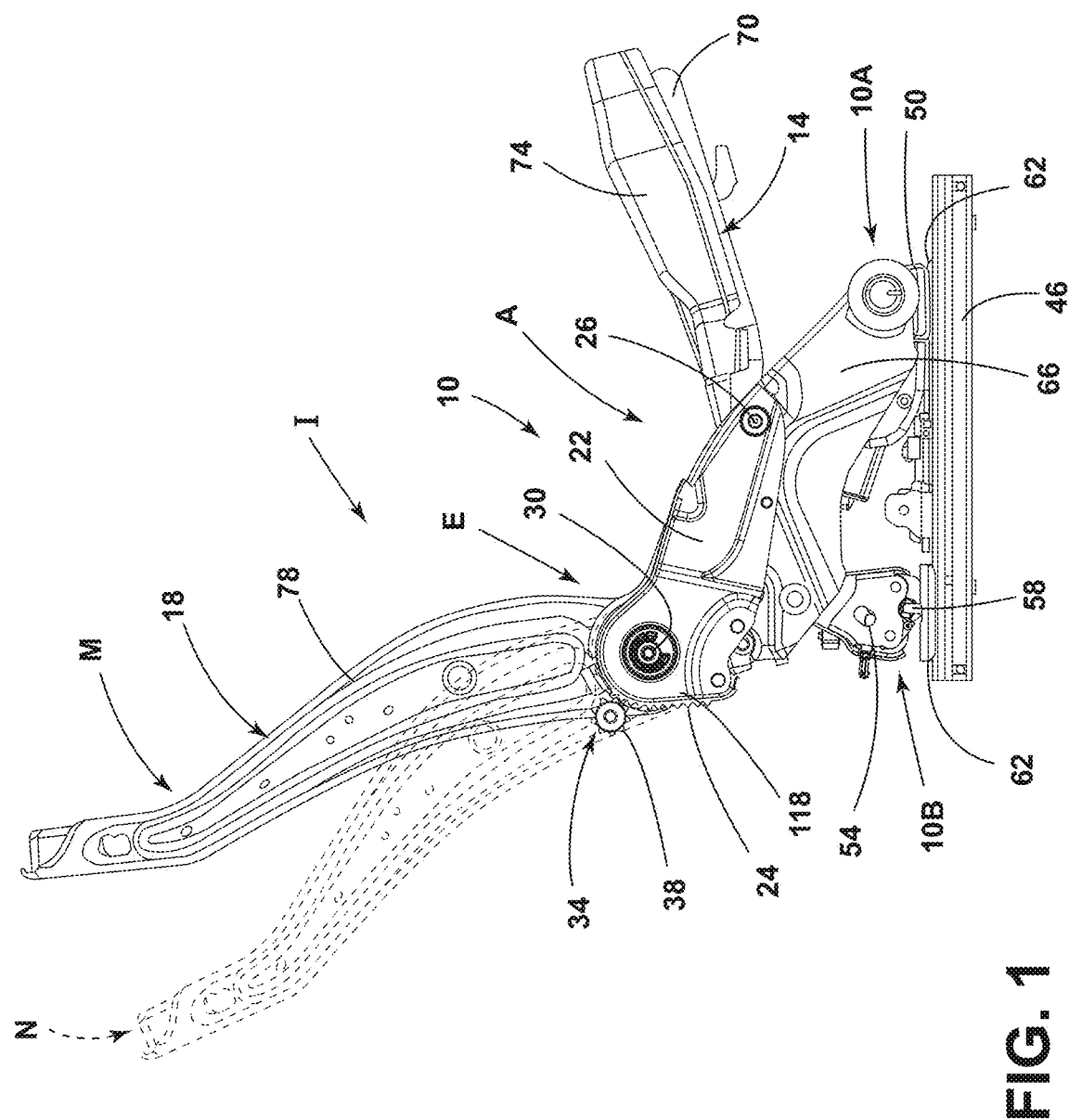
FIG. 1 is a right side elevational view of a vehicle seating assembly disposed on a track assembly with the seatback in a substantially upright position and a rearward reclined position.

Referring to FIGS. 1-15, a vehicle seating assembly 10 includes a seat 14, a seatback 18, and a bracket 22 extending between the seat 14 and the seatback 18. The bracket 22 has a first pivotable coupling 26 between the bracket 22 and the seat 14. The bracket 22 has a second pivotable coupling 30 between the bracket 22 and the seatback 18. The bracket 22 includes a sector gear portion 24. The vehicle seating assembly 10 includes a gear assembly 34 with a spur gear 38 and a sector gear portion 24 disposed along an edge 118 of the bracket 22. The spur gear 38 is rotatable to engage the sector gear portion 24 to move the bracket 22 from a first position A to a second position B to move the second pivotable coupling 30 from a primary position E to a secondary position F.

With reference to FIG. 1, in the vehicle seating assembly 10 described below and shown in the attached figures, the term seating assembly 10 in the sitting position I refers to the position of the seating assembly 10 when the seating assembly 10 is attached to a track assembly 46 at the mounting bracket 50 disposed at the forward portion 10A of the seating assembly 10 and at a latch assembly 54 disposed at the rearward portion 10B of the seating assembly 10. In one example, the seating assembly 10 in the sitting position I includes the latch assembly 54 engaged with a striker 58 coupled to the track assembly 46.

With further reference to the vehicle seating assembly 10 described below and shown in the attached figures, the vehicle seating assembly 10 may be described from the vantage point of a passenger sitting in the seating assembly 10. The side of a seating assembly 10 disposed on a right side of a seated passenger may be referred to as a right side of the seating assembly 10. The side of the seating assembly 10 disposed on the left side of a seated passenger may be referred to as the left side of the seating assembly 10.

Referring now to FIGS. 1-3B, the seating assembly 10 is shown disposed on the track assembly 46. In FIG. 1, the seating assembly 10 is in the sitting position I, the seatback 18 is in the substantially upright position M, and the bracket 22 is in the first position A. The seatback 18 is also shown in a rearward reclined position N that a passenger may utilize when a passenger desires to recline and/or sleep in the seating assembly 10. The seating assembly 10 includes a seat 14 and a seatback 18. A bracket 22 extends between the seat 14 and the seatback 18. The seat 14 may be coupled to rails 62 disposed in a track assembly 46. The rails 62 may be slidable in the track assembly 46. In the example shown, the seat 14 may include a seat frame 66. A carrier 70 may extend away from the seat frame 66. A seat pan 74 may be coupled to the carrier 70. The seat pan 74 may receive a seat cushion. The seatback 18 may include a seatback frame 78. A gear assembly 34 for moving the bracket 22 between the first position A and the second position B and thus moving the second pivotable coupling 30 between the seatback 18 and the bracket 22 from the primary position E to the secondary position F is shown.

With continued reference to FIGS. 1-3B, adaptability of a seating assembly 10 to meet different passenger needs may contribute to a pleasant travel experience. Passengers may wish to reconfigure vehicle seating assemblies 10 to create additional space for cargo in a vehicle 80. By moving the pivot point (second pivotable coupling 30) of the seatback 18 from a primary position E to a secondary position F, the seatback 18 may be positioned in a substantially flat position P over the seat 14 to create a substantially flat load floor 82. In this way, a passenger may reconfigure a seating assembly 10 to provide cargo storage space 36 atop the substantially flat load floor 82. A box 84 or other cargo may be stored on the seatback 18 in the substantially flat position P.

Passengers may also desire convenient vehicle 80 ingress and egress. A seating assembly 10 may be disposed adjacent a vehicle door 86. (FIG. 13.) The seating assembly 10 may be conveniently movable from a sitting position I (FIG. 12) to a standing position J (FIG. 13) to allow a passenger space to access an adjacent row of seating. The seating assembly 10 in the standing position J may also be slidable along the track assembly 46 disposed in the vehicle floor 90 to increase the available entry or egress space between the adjacent row of seating and the vehicle door 86. As such, a reconfigurable seating assembly 10 may contribute to a pleasant travel experience by providing additional cargo storage space 36 on a substantially flat load floor 82 and adaptability for vehicle 80 entry and egress.

Figure 2:
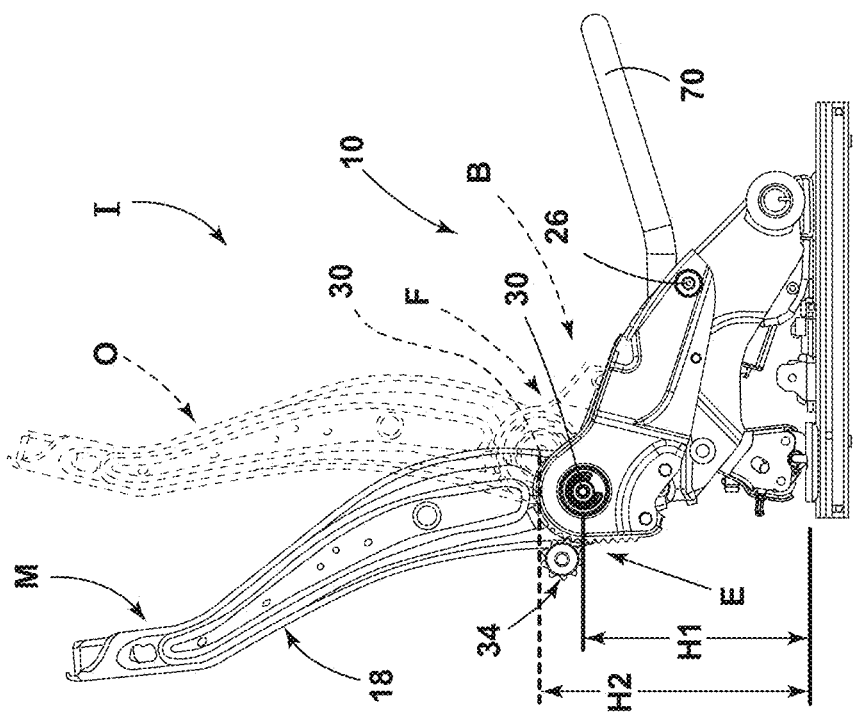
FIG. 2 is a right side elevational view of a vehicle seating assembly disposed on a track assembly with the seatback in a substantially upright position and a forward inclined position.

Referring to FIG. 2, the seating assembly 10 is shown with the second pivotable coupling 30 in a primary position E and a secondary position F. When the second pivotable coupling 30 is in the secondary position F, then the seatback 18 is in a forward inclined position O. When the second pivotable coupling 30 is in the primary position E, the second pivotable coupling 30 may have a first height H1. When the second pivotable coupling 30 is in the secondary position F, the second pivotable coupling 30 may have a second height H2. The first height H1 may correspond to the distance between the center of the second pivotable coupling 30 and the track assembly 46 when the second pivotable coupling 30 is in the primary position E. The second height H2 may correspond to the distance between the center of the second pivotable coupling 30 and the track assembly 46 when the second pivotable coupling 30 is in the secondary position F. The second height H2 may be greater than the first height H1.

Figure 3A:
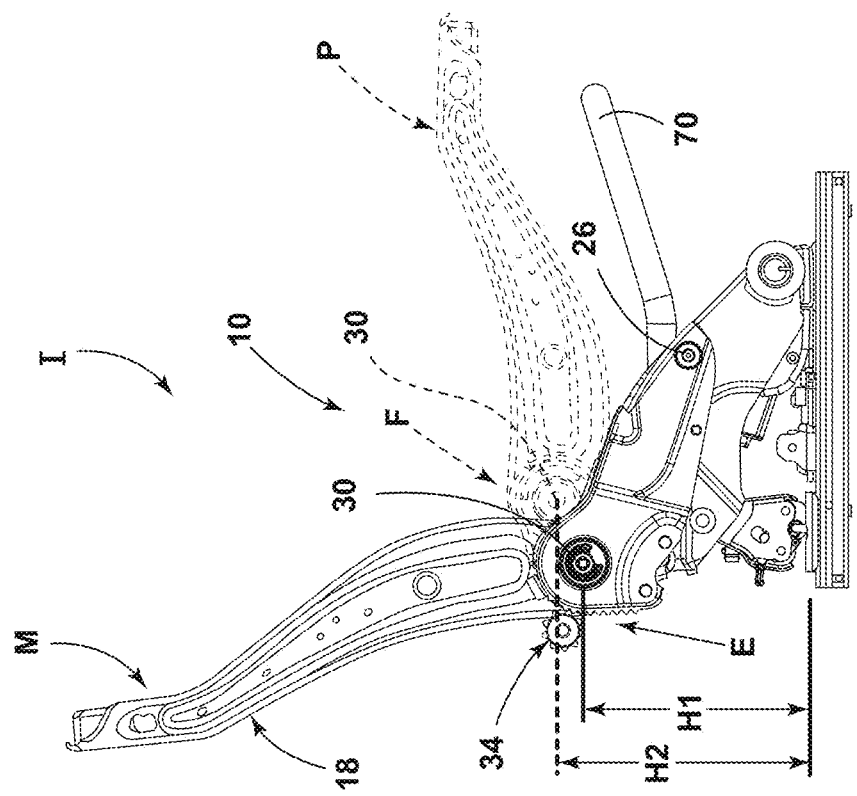
FIG. 3A is a right side elevational view of a vehicle seating assembly disposed on a track assembly with the seatback in a substantially upright position and a substantially flat position.
Figure 3B:
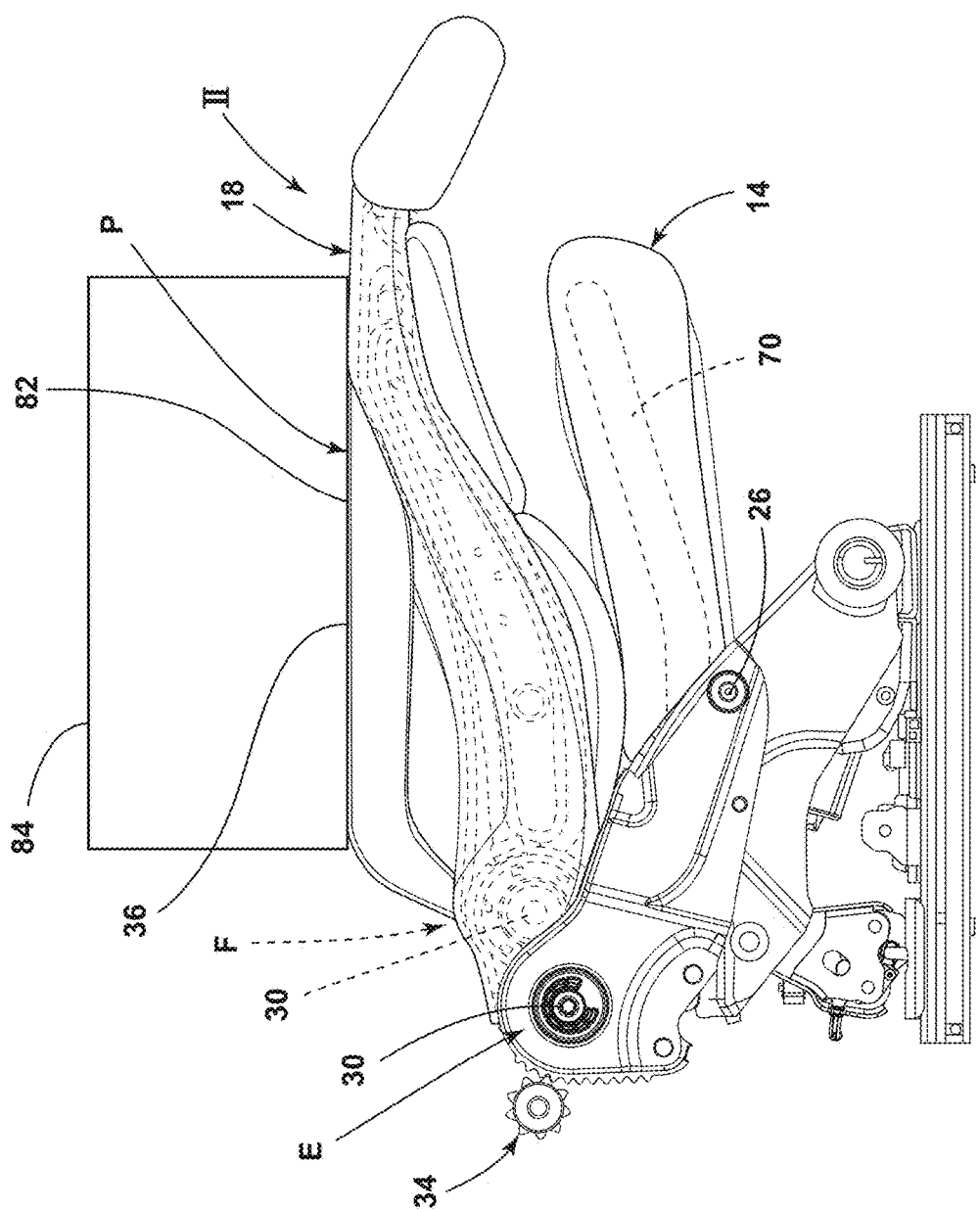
FIG. 3B is a right side elevational view of a vehicle seating assembly with the seatback in a substantially flat position.

Referring to FIGS. 3A-3B, the seating assembly 10 is shown with the second pivotable coupling 30 in the primary position E and the secondary position F. The seatback 18 is shown in the substantially upright position M and the substantially flat position P. As such, the seatback 18 extends over the seat 14. The second pivotable coupling 30 is raised from the primary position E to the secondary position F to allow the seatback 18 to lay on the seat 14 in a substantially horizontal position (for example, substantially flat position P) to create a substantially flat load floor 82 for the convenient storage of cargo (for example, box 84) in the vehicle 80.

Figure 4:
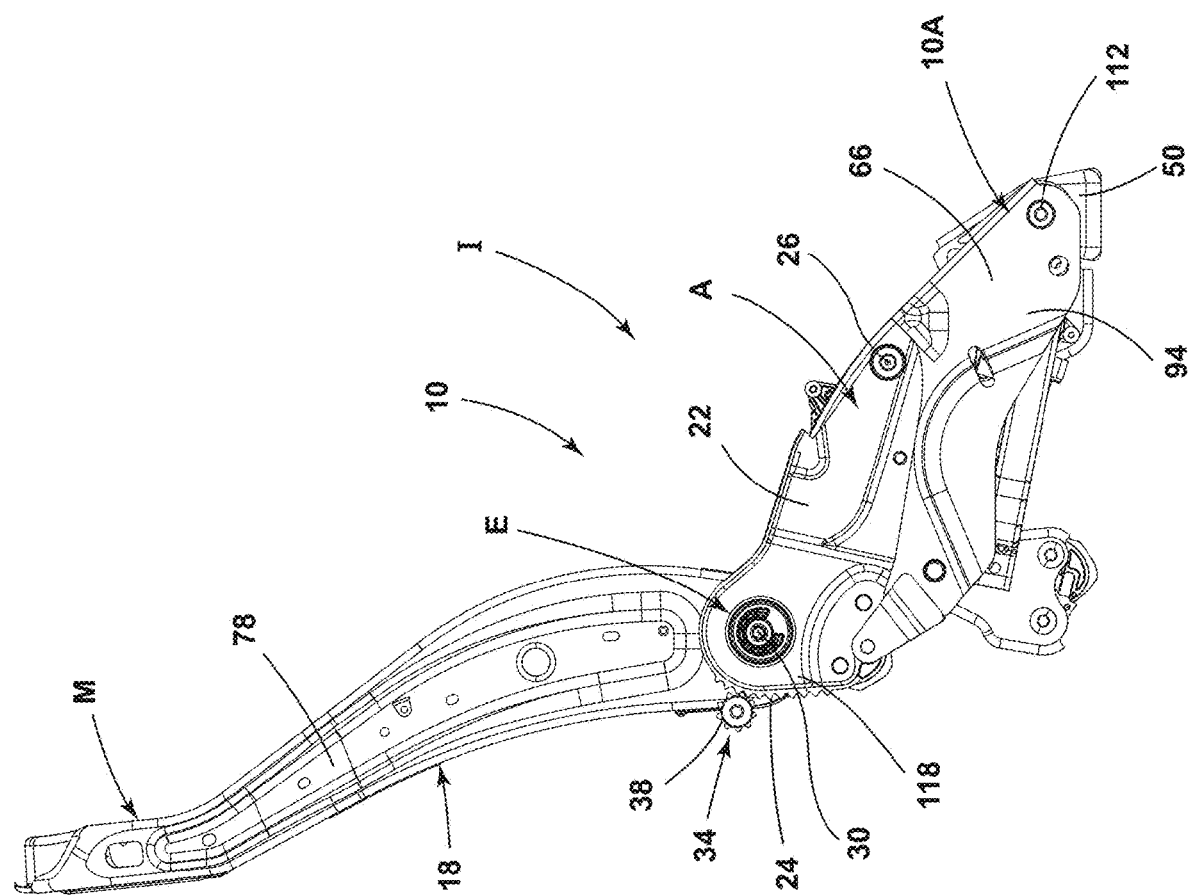
FIG. 4 is a right side elevational view of a vehicle seating assembly with the seatback in a substantially upright position, the bracket in the first position, and the second pivotable coupling in the primary position.
Figure 5:
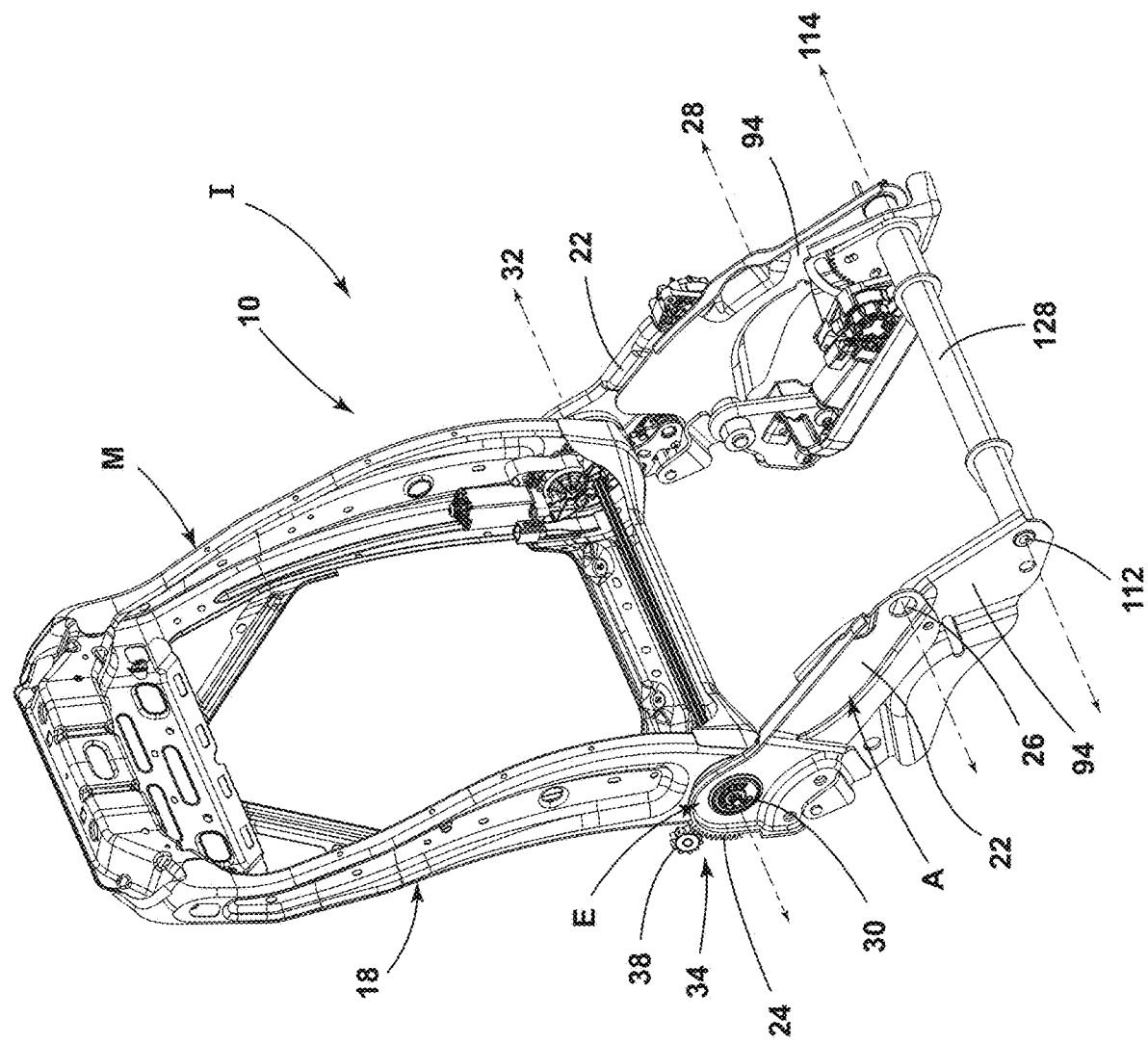
FIG. 5 is a right side perspective view of the vehicle seating assembly of FIG. 4.

Referring now to FIGS. 4-5, the vehicle seating assembly 10 is shown in the sitting position I. A first pivotable coupling 26 is shown between the bracket 22 and the seat frame 66. The first pivotable coupling 26 defines a first axis of rotation 28 that extends through the seat frame 66 and the B-bracket 94. A second pivotable coupling 30 is shown between the bracket 22 and the seatback frame 78. The second pivotable coupling 30 defines a second axis of rotation 32 that extends through the seatback frame 78. A third pivotable coupling 112 is shown between the seat frame 66 and a mounting bracket 50 disposed at the forward portion 10A of the seating assembly 10. The mounting bracket 50 may be attached to rail 62 that may be slidably disposed in the track assembly 46. The third pivotable coupling 112 defines a third axis of rotation 114 that extends through the B-bracket 94 and the seat frame 66. The third axis of rotation 114 may extend through the elongated member 128.

With reference to FIGS. 4-9, the bracket 22 is rotatable about the first axis of rotation 28 to move the seatback 18 from a substantially upright position M to a forward inclined position O. The seatback 18 is rotatable around the second axis of rotation 32 to move the seatback 18 from a forward inclined position O to the substantially flat position P.

With reference to FIGS. 12-15, the seating assembly 10 is pivotable about the third axis of rotation 114 to move seating assembly 10 from the sitting position I to the standing position J when the seatback 18 is in the substantially upright position M.

With reference to FIGS. 4-10, a gear assembly 34 includes a spur gear 38 and a sector gear portion 24 of a bracket 22 that are disposed along an edge 118 of the bracket 22. The spur gear 38 is rotatable to engage the sector gear portion 24 to move the bracket 22 from a first position A to a second position B, thereby moving the second pivotable coupling 30 from a primary position E to a secondary position F.

With reference to FIGS. 4 and 5, when the seating assembly 10 is in the sitting position I, the bracket 22 is in the first position A, and the second pivotable coupling 30 is in the primary position E, then the seatback 18 is in a substantially upright position M.

Figure 6:
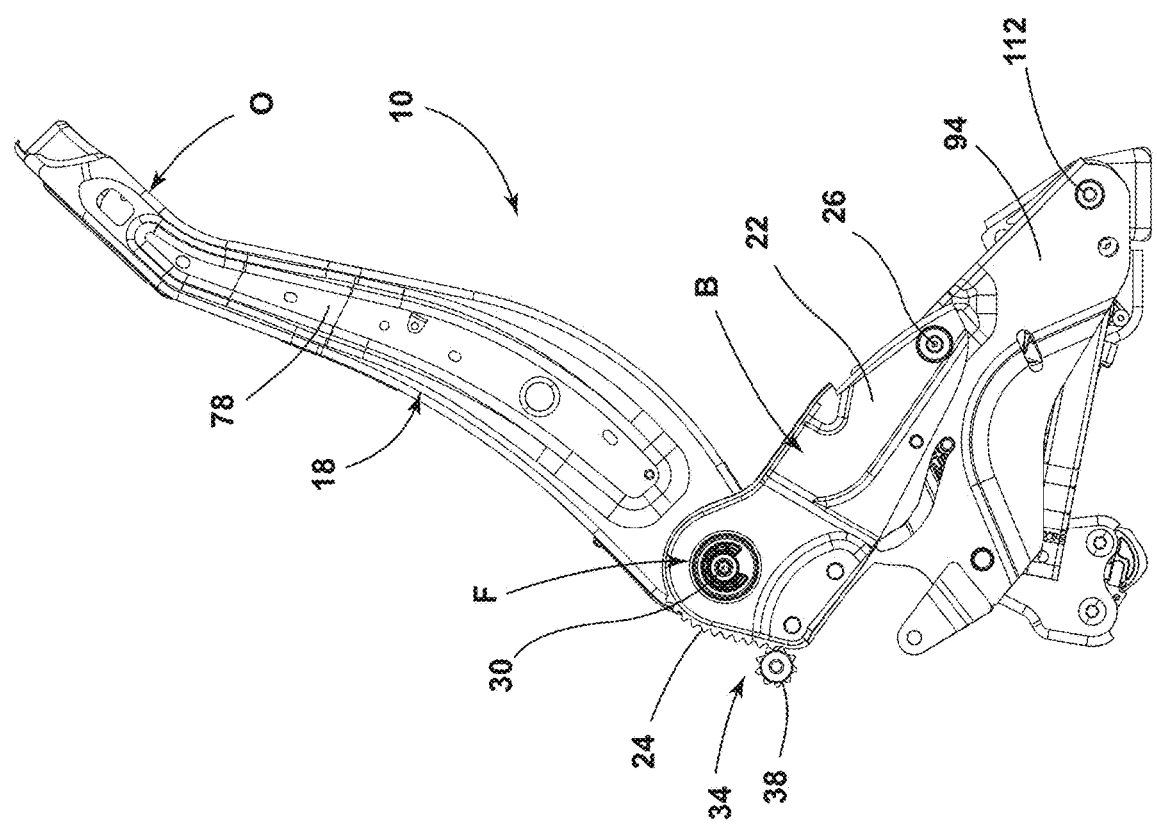
FIG. 6 is a right side elevational view of a vehicle seating assembly with the seatback in the forward inclined position, the bracket in the second position, and the second pivotable coupling in the secondary position.
Figure 7:
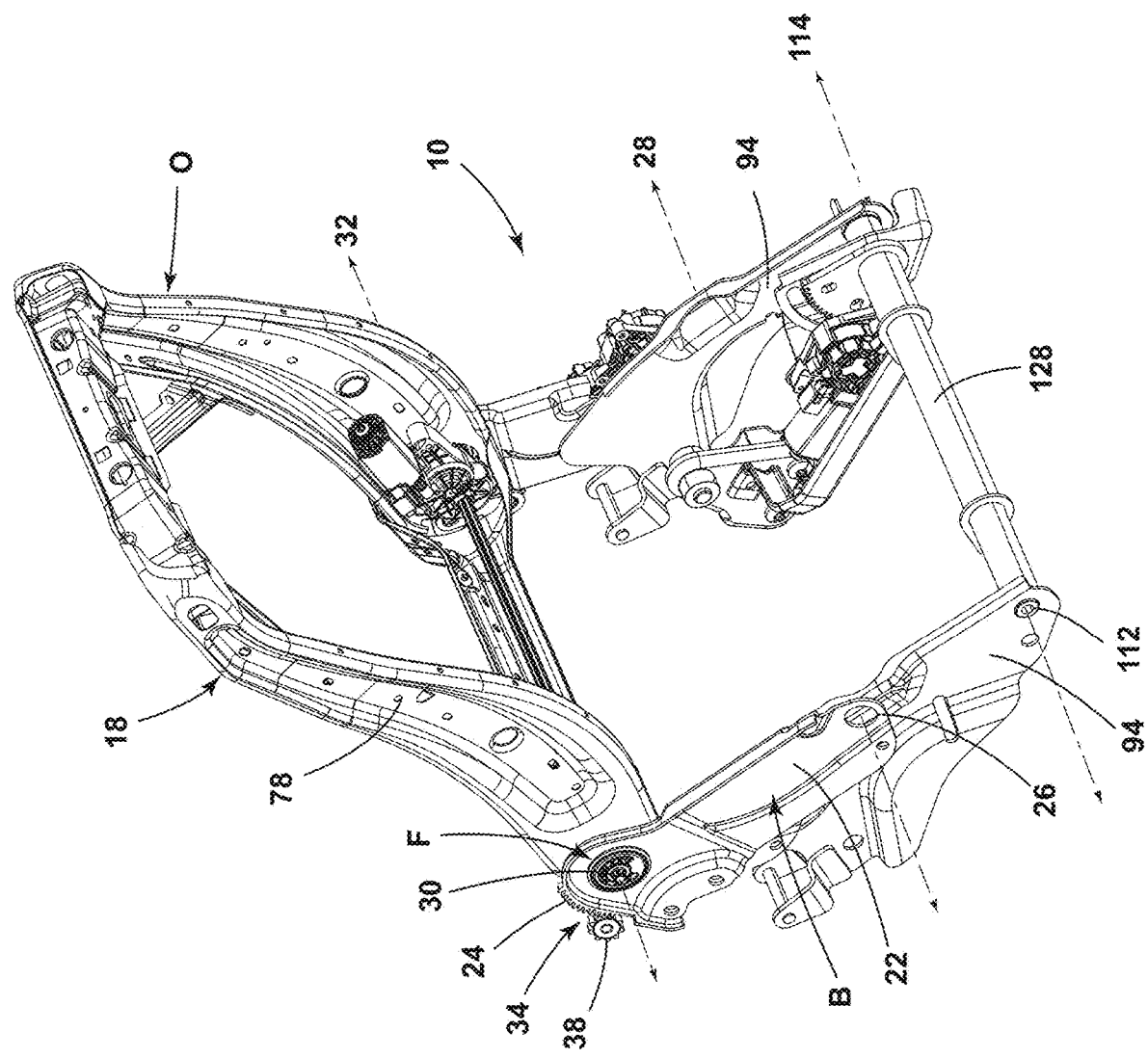
FIG. 7 is a right side perspective view of the vehicle seating assembly of FIG. 6.
Figure 8:
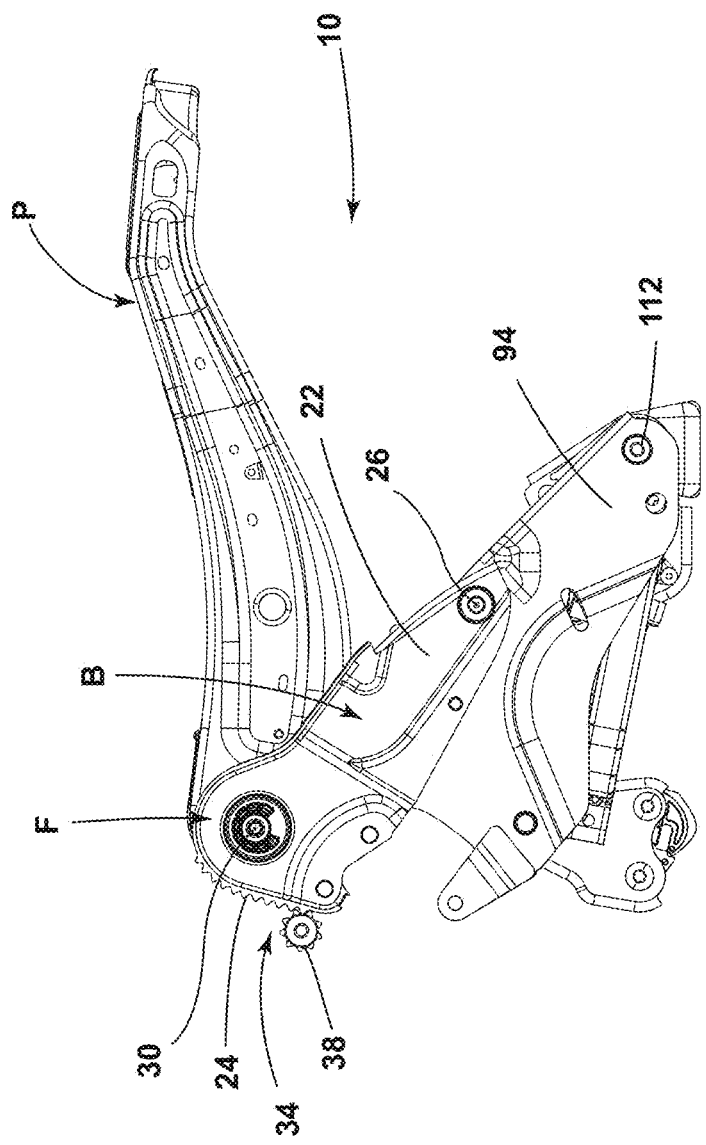
FIG. 8 is a right side elevational view of a vehicle seating assembly with the seatback in the substantially flat position, the bracket in the second position, and the second pivotable coupling in the secondary position.
Figure 9:
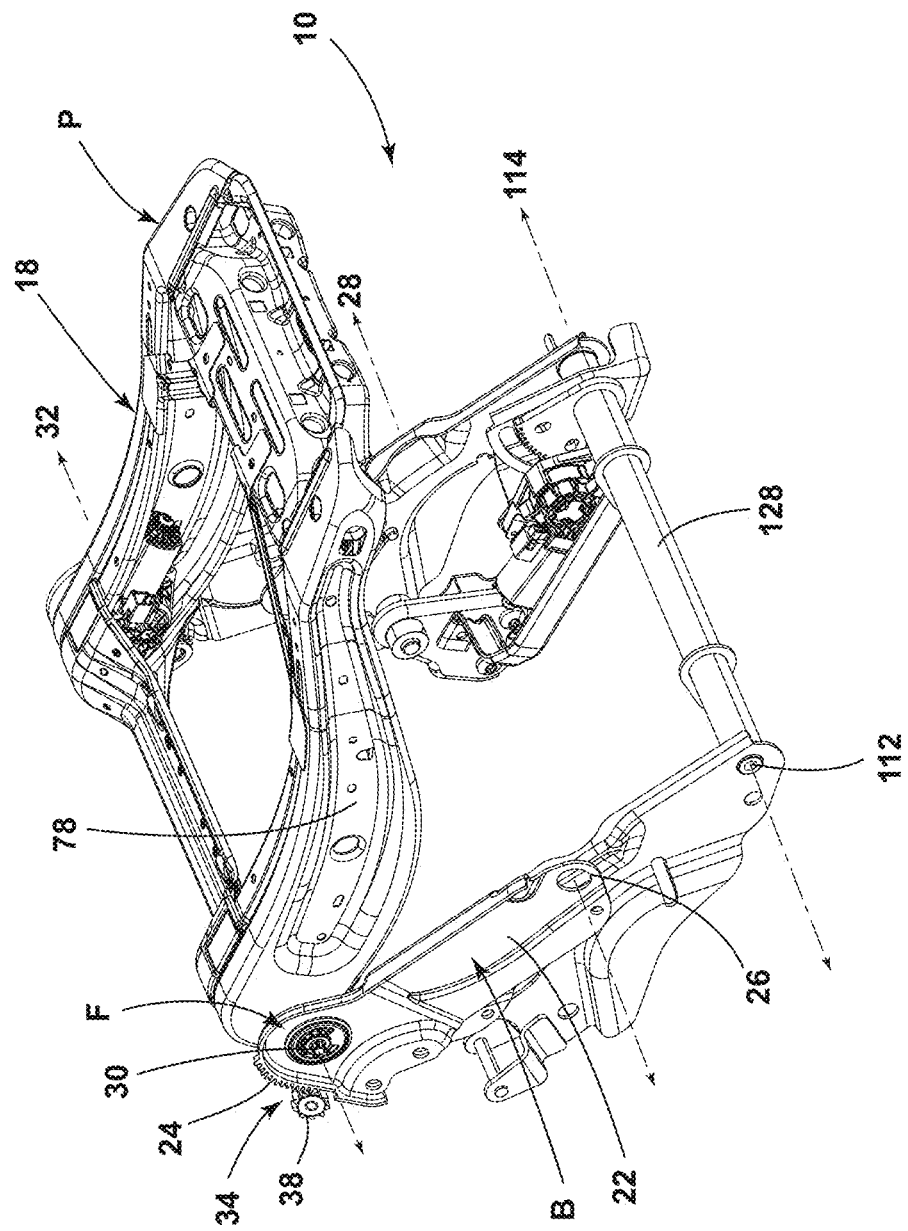
FIG. 9 is a right side perspective view of the vehicle seating assembly of FIG. 8.

With reference to FIGS. 6 and 7, when the bracket 22 is in the second position B and the second pivotable coupling 30 between the bracket 22 and the seatback 18 is in the secondary position F, then the seatback 18 is in a forward inclined position O.

With reference to FIGS. 6-9, when the seatback 18 is in the forward inclined position O, then the seatback 18 may be rotated about the second pivotable coupling 30 between a forward inclined position O and a substantially flat position P. In the substantially flat position P, the seatback 18 is disposed over the seat 14. As such, the second axis of rotation 32 is rotatable about the first axis of rotation 28 to move the second pivotable coupling 30 from the primary position E to the secondary position F.

Figure 10:
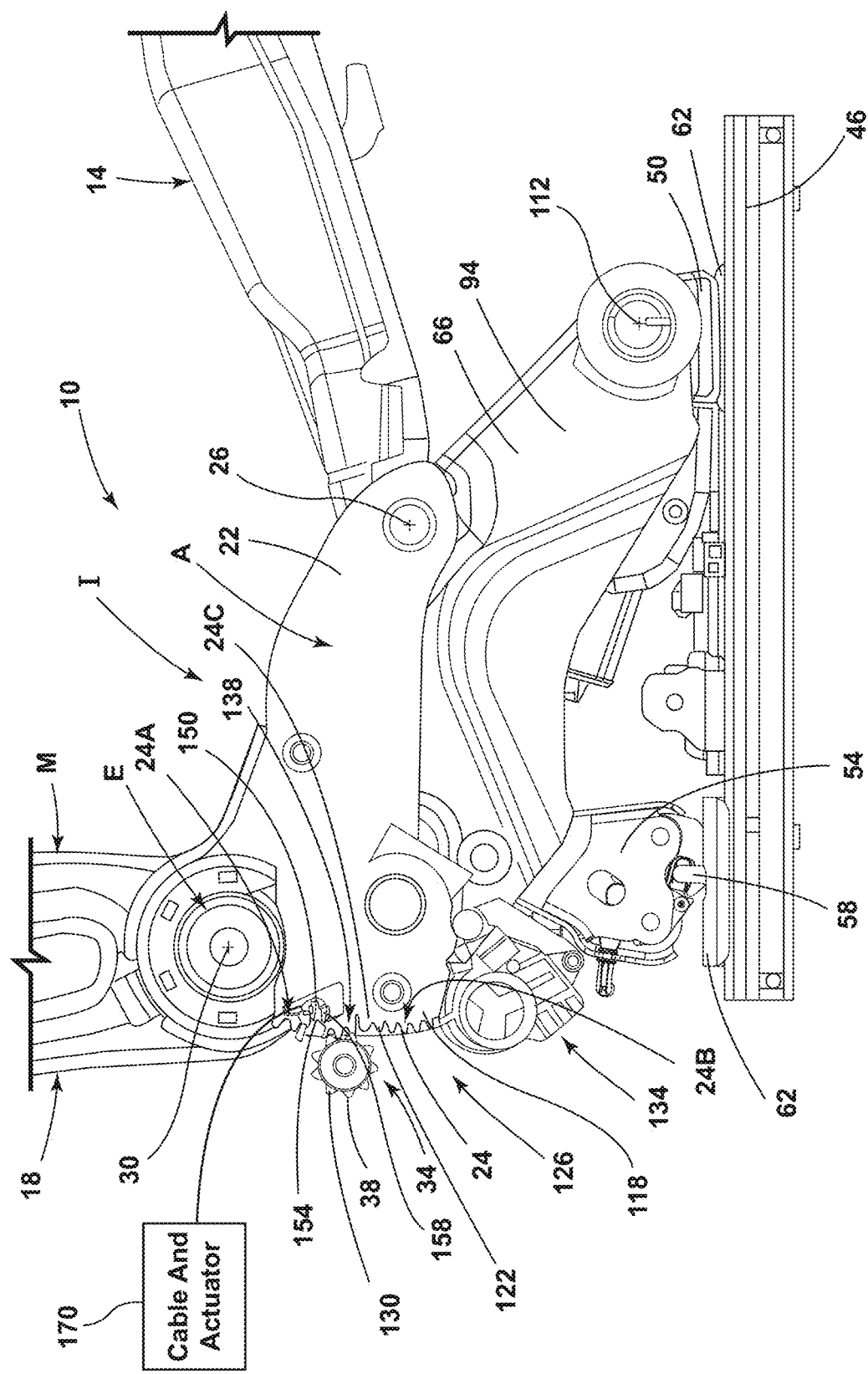
FIG. 10 is an exploded right side elevational view of a portion of the vehicle seating assembly disposed on a track assembly with the seatback in the substantially upright position, the bracket in the first position, and the second pivotable coupling in the primary position.

With reference to FIG. 10, an exploded view of the lift mechanism 126 is shown. The lift mechanism 126 may include the sector gear portion 24 of the bracket 22 and the spur gear 38. The seating assembly 10 is the sitting position I. The bracket 22 is in the first position A, the second pivotable coupling 30 is in the primary position E. The seatback 18 is in the substantially upright position M. The seating assembly 10 may be coupled to the track assembly 46. The seating assembly 10 components may be attached to rails 62 that may be slidable in the track assembly 46. The seat frame 66 may include the mounting bracket 50 disposed on the rail 62. The seat frame 66 may include a latch assembly 54 that is detachable from a striker 58 disposed on a rail 62 in the track assembly 46. The bracket 22 is shown coupled to the first pivotable coupling 26. The first pivotable coupling 26 may include an elongated member 128 that may extend through the bracket 22 and the B-bracket 94 of the seat 14. The B-bracket 94 of the seat 14 may also be referred to as the side bracket of the seat 14. The B-bracket 94 of the seat 14 may be coupled to the third pivotable coupling 112 disposed at the forward portion 10A of the seating assembly 10 and extending through the mounting bracket 50 disposed on the rail 62.

With continued reference to FIG. 10, and referring again to the bracket 22, the bracket 22 may include a toothed portion 122 disposed on the sector gear portion 24 of the bracket 22 distal from the first pivotable coupling 26. The toothed portion 122 may be disposed on the edge 118 of the bracket 22. The toothed portion 122 on the bracket 22 may mesh with the toothed portion 130 on the spur gear 38. As the spur gear 38 rotates, the toothed interface 138 between the toothed portion 122 on the bracket 22 and the toothed portion 130 on the spur gear 38 rotates the bracket 22 about the first pivotable coupling 26 to raise the bracket 22 from the first position A of the bracket 22 to the second position B of the bracket 22. A motor 134 for driving the spur gear 38 may be positioned proximate the spur gear 38. The spur gear 38 may be located at an upper portion of the bracket 22 to achieve an approximately maximum vertical travel (for example, height H1 subtracted from height H2, see FIGS. 2 and 3A).

With reference to FIG. 10, a mechanical lock 150 is disposed through the bracket 22 and secured to the seat frame 66. The mechanical lock 150 may be positionable in an engaged position and a disengaged position. In the engaged position, the bracket 22 is negligibly rotatable about the first pivotable coupling 26. In the disengaged position, the bracket 22 is rotatable about the first pivotable coupling 26 between a first position A and a second position B. The mechanical lock 150 may include a pin 154 disposed through an opening 158 in the bracket 22. The pin 154 may be disposed through the opening 158 to maintain the bracket 22 in the first position A. As such, the mechanical lock 150 provides a way to secure the second pivotable coupling 30 of the seating assembly 10 in the primary position E (when the pin 154 is disposed through the opening 158). The pin 154 may be withdrawn from the opening 158 in the bracket 22 through cable-release actuation. A cable 170 may be activated to withdraw the pin 154 from the opening 158. The pin 154 may be spring loaded. A passenger may pull the pin 154 to withdraw it from the opening 158 and actuate the spur gear 38 to move the bracket 22 between the first and second positions A, B of the bracket 22. The pin 154 may extend into the opening 158 of the bracket 22 when the bracket 22 returns to the first position A. As such, the mechanical lock 150 may act as a secondary locking mechanism to the primary locking mechanism defined by the toothed interface 138 of the spur gear 38 and the bracket 22. A passenger may pull the cable 170 to withdraw the pin 154 from the opening 158 in the bracket 22 when the seatback 18 in a substantially horizontal or substantially flat position P as needed to achieve a substantially flat load floor 82. When the seat 14 is in the sitting position I with the bracket 22 in the first position A and the secondary pivotable coupling 30 in the primary position E, then the seatback 18 may engage a rearmost case-hardened stop and may be secured by the primary locking mechanism (structural toothed interface 138 between the spur gear 38 and the bracket 22) and the secondary locking mechanism (toothed interface 138 between the sector gear portion 24 and the spur gear 38).

It should be noted that the sector gear portion 24 of the bracket 22 shown in FIG. 10 may have various edge 118 profiles designed to regulate the movement of the secondary pivotable coupling 30 as the secondary pivotable coupling 30 moves from the primary position E to the secondary position F. In the example shown in FIG. 10, the sector gear portion 24 includes a first sector gear portion 24A and a second sector gear portion 24B. A notch 24C may be disposed between the first sector gear portion 24A and the second sector gear portion 24B. The design (for example, curvature(s) of the toothed portion 122 on the bracket 22 in the first sector gear portion 24A and the second sector gear portion 24B, length of the toothed portion 122 on the bracket 22 in the first sector gear portion 24A and the second sector gear portion 24B) may determine the motion of the second pivotable coupling 30 as it travels between the primary position E and the secondary position F.

Figure 11A:
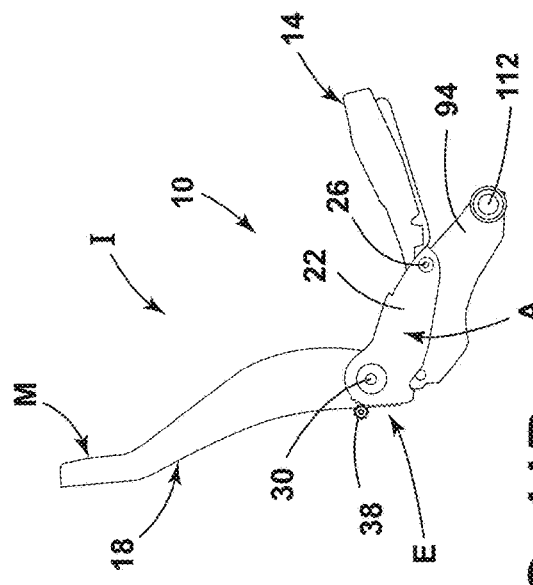
FIG. 11A is a right side schematic perspective view of a vehicle seating assembly with the seatback in a substantially upright position, the bracket in the first position, and the second pivotable coupling in the primary position.
Figure 11B:
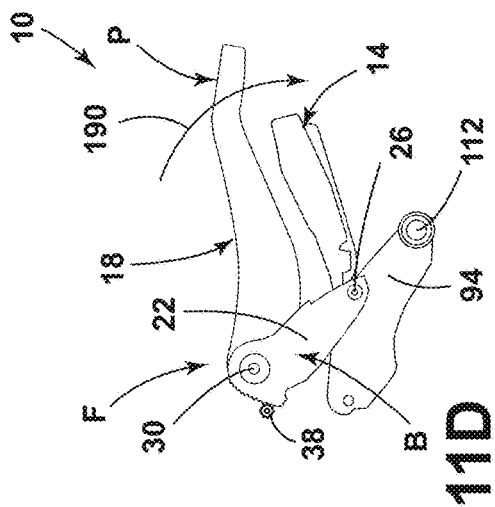
FIG. 11B is a right side schematic elevational view of a vehicle seating assembly with the seatback in the substantially upright position, the bracket in the first position, and the second pivotable coupling in the primary position.

Referring now to FIGS. 11A-11D, the sequence of the movement of the seating assembly 10 from a sitting position I with the seatback in the substantially upright position M (FIGS. 11A-11B) to a storage position with a seatback 18 in a substantially flat position P (FIG. 11D) is shown. FIGS. 11A-11B show the seating assembly 10 in the sitting position I. The seatback 18 is in the substantially upright position M. The spur gear 38 is disposed at the upper portion of the bracket 22. The bracket 22 is in the first position A. Arrow 174 shows the direction the spur gear 38 will rotate to move the bracket 22 from the first position A to the second position B. Arrow 182 shows the direction of the rotation of the bracket 22 around the first pivotable coupling 26 as the bracket 22 moves from the first position A to the second position B. The second pivotable coupling 30 is shown in the primary position E.

Figure 11C:
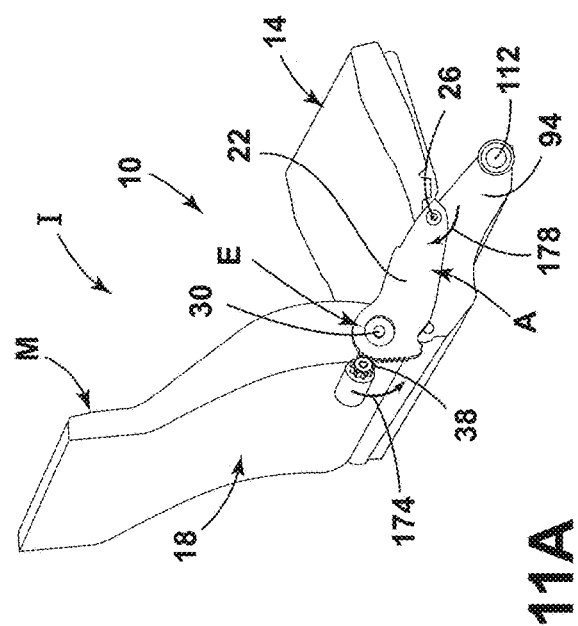
FIG. 11C is a right side schematic elevational view of a vehicle seating assembly with the seatback in the forward inclined position, the bracket in the second position, and the second pivotable coupling in the secondary position.

Referring to FIG. 11C, the bracket 22 is shown in the second position B. The direction of rotation of the bracket 22 from the first position A to the second position B is shown by arrow 186. The second pivotable coupling 30 is shown in the secondary position F. The direction of movement of the seatback 18 from the forward inclined position O to the substantially flat position P is shown by arrow 190.

Figure 11D:
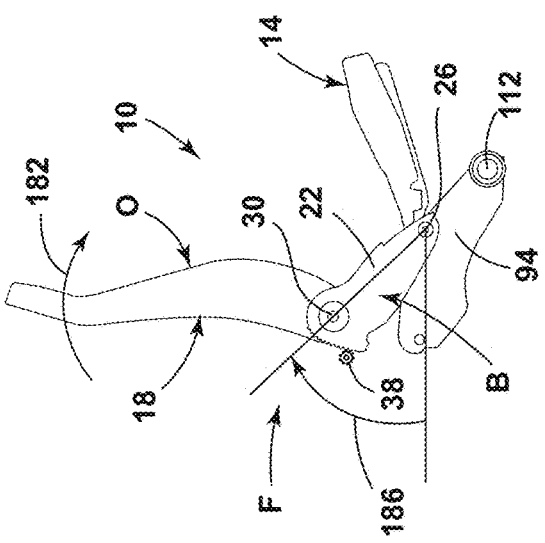
FIG. 11D is a right side schematic elevational view of the vehicle seating assembly with the seatback in the substantially flat position, the bracket in the second position, and the second pivotable coupling in the secondary position.

Referring to FIG. 11D, the bracket 22 is shown in the second position B. The second pivotable coupling 30 is shown in the secondary position F. The seatback 18 is shown in the substantially flat position P. The arrow 190 shows the direction that the seatback 18 rotates around the second pivotable coupling 30 from the forward inclined position O to the substantially flat position P.

Figure 12:
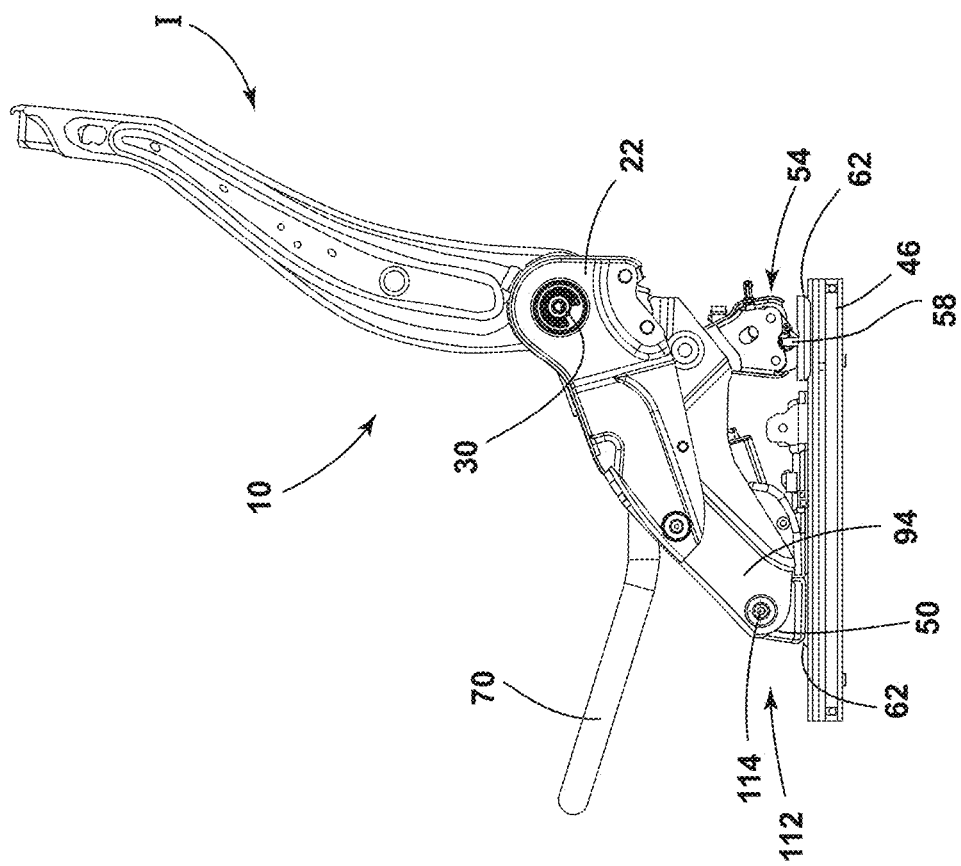
FIG. 12 is a left side elevational view of the seating assembly in a sitting position disposed on a track assembly.
Figure 13:
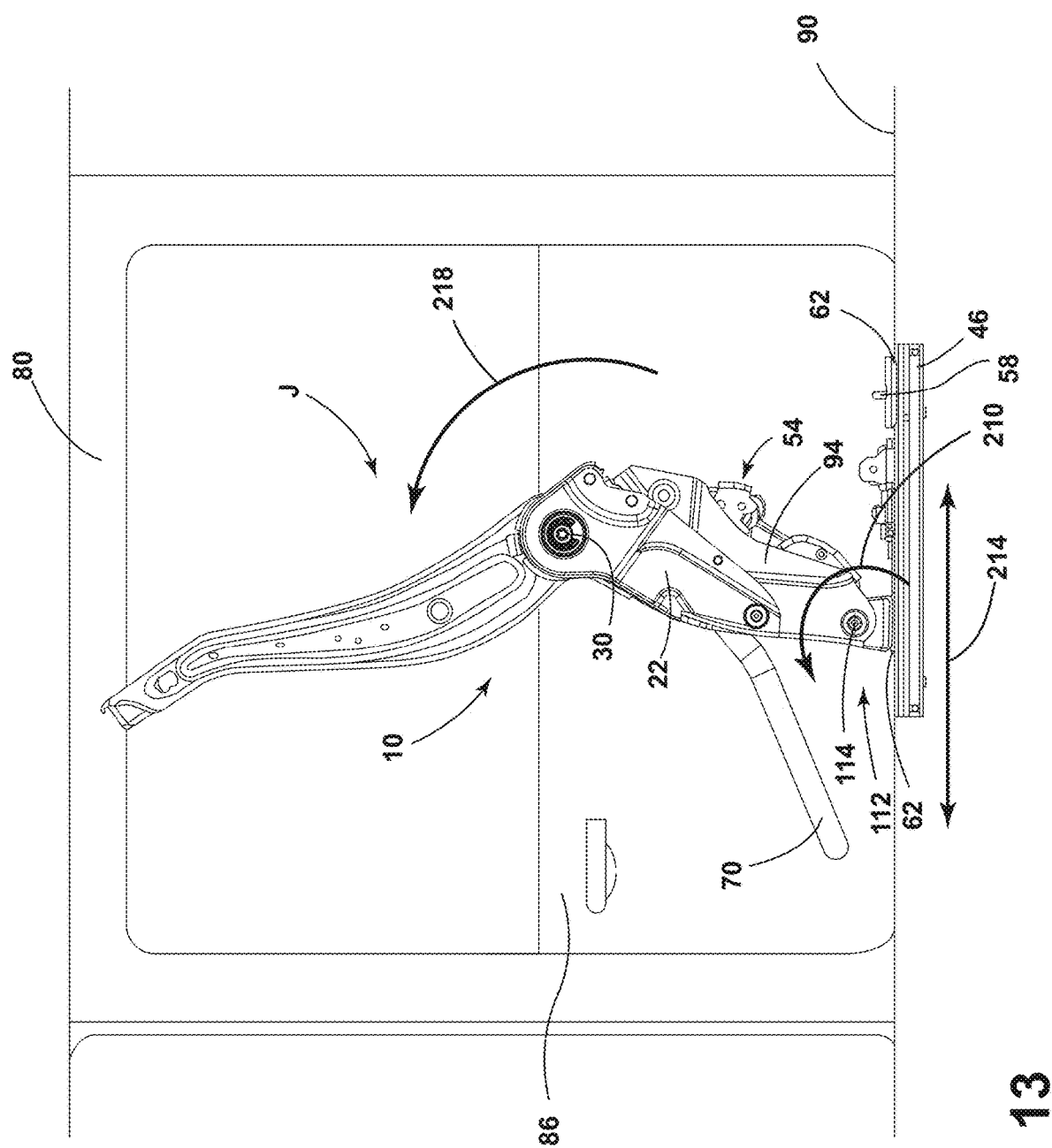
FIG. 13 is a left side elevational view of the seating assembly in a standing position disposed on a track assembly.

Referring to FIG. 12, the seating assembly 10 is shown in the sitting position I and disposed on the track assembly 46. The seating assembly 10 includes B-brackets 94 disposed on opposing sides of the seating assembly 10. Each of the B-brackets 94 may include a third pivotable coupling 112 for rotatably coupling the B-brackets 94 to mounting brackets 50 fixedly coupled to the rails 62. The latch assemblies 54 may secure the seating assembly 10 to a striker 58 coupled to the rails 62. As such, it is contemplated that the latch assemblies 54 may be released to rotate the seating assembly 10 from a sitting position I (FIG. 12) to a standing position J (FIG. 13) about the third pivotable coupling 112 and in the direction shown by arrow 210. The third axis of rotation 114 is shown extending through the third pivotable coupling 112. Arrow 210 shows the rotation of the seating assembly 10 around the third pivotable coupling 112 as the seating assembly 10 moves from the sitting position I to the standing position J. Arrow 214 shows the direction of travel of the seating assembly 10 along the track assembly 46 as the seating assembly 10 moves fore and aft within the vehicle 80 to create a larger space for passenger ingress and egress into a space behind the seating assembly 10. As such, the seating assembly 10 may be moved from the sitting position I to the standing position J to allow convenient passenger or cargo ingress and egress into a space behind the seating assembly 10.

With continued reference to FIG. 13, the second pivotable coupling 30 may move in the direction shown by arrow 218 as the seating assembly 10 moves from the sitting position I to the standing position J. The latch assembly 54 may tuck under the B-bracket 94 of the seating assembly 10 as the seating assembly 10 moves from the sitting position I to the standing position J.

Figure 15:
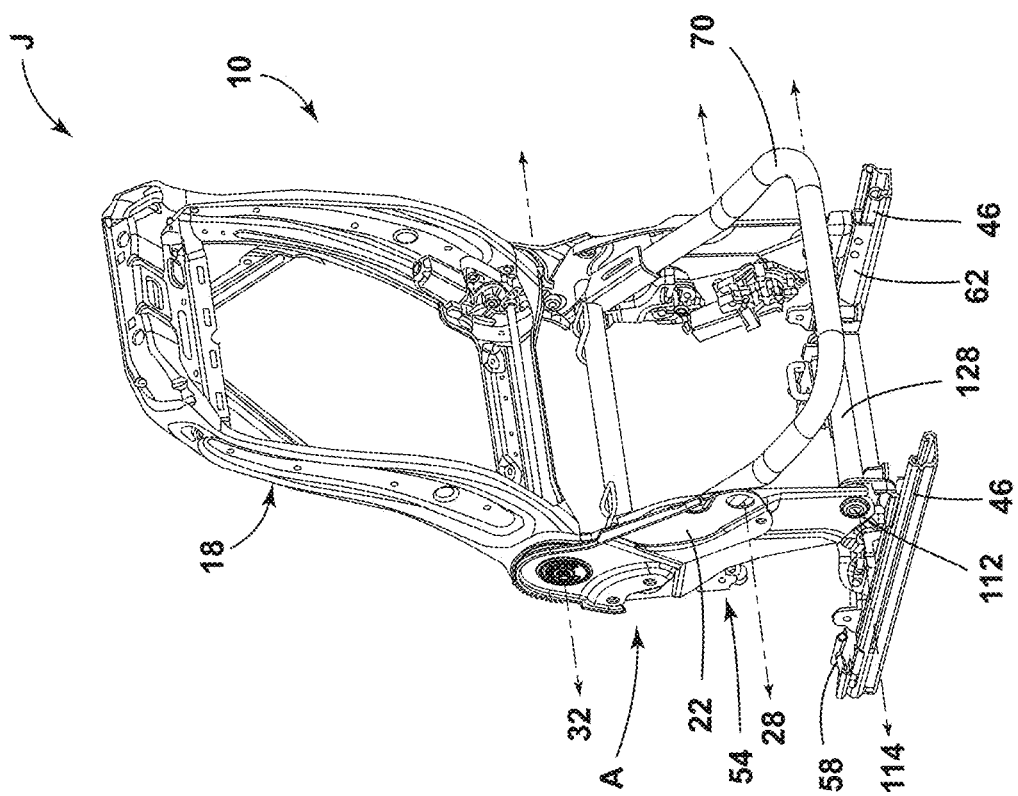
FIG. 15 is a front right side perspective view of the seating assembly in the standing position disposed on the track assembly.
Figure 14:
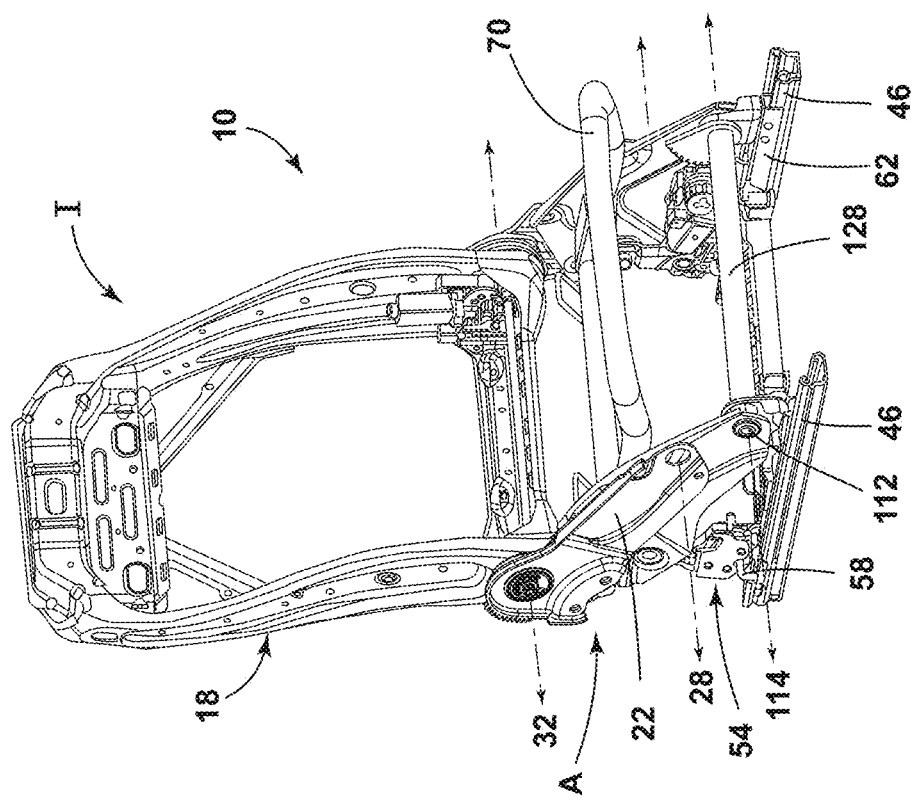
FIG. 14 is a front right side perspective view of the seating assembly in the sitting position disposed on the track assembly.

Referring now to FIG. 14, the seating assembly 10 is shown in the sitting position I. Referring now to FIG. 15, the seating assembly 10 is shown in the standing position J.

With reference to FIGS. 1-15, the bracket 22, the sector gear portion 24, and the spur gear 38 are shown disposed on the right side of the vehicle seating assembly 10. It is contemplated that the bracket 22, the sector gear portion 24, and the spur gear 38 may be disposed on the left side of the vehicle seating assembly 10. It is also contemplated that opposing brackets 22, sector gear portions 24, and spur gears 38 may be disposed on both sides (right side and left side) of the vehicle seating assembly 10. It is contemplated that the brackets 22, sector gear portions 24, and spur gears 38 could be disposed elsewhere in the vehicle seating assembly 10 in addition to on the right and/or left sides of the vehicle seating assembly 10.

A variety of advantages may be obtained by use of the present disclosure. A passenger may reconfigure the seating assembly 10 to meet various passenger needs. The second pivotable coupling 30 in a primary position E may allow a passenger to recline the seatback 18 from a substantially upright position M to a rearward reclined position N for sleeping or resting. The vehicle seating assembly 10 with the second pivotable coupling 30 in a secondary position F may allow the seatback 18 to rotate between a forward inclined position O to a substantially flat position P to create a substantially flat load floor 82 for storing cargo. The seating assembly 10 may be moved between a sitting position I and a standing position J to allow passenger egress and ingress to and from a space behind the vehicle seating assembly 10.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly, comprising:
   a seat;
   a seatback;
   a bracket extending between the seat and the seatback and having:
      a first pivotable coupling between the bracket and the seat;
      a second pivotable coupling between the bracket and the seatback; and
      a sector gear portion;
   a gear assembly including:
      a spur gear; and
      the sector gear portion disposed along an edge of the bracket, wherein the spur gear is rotatable to engage the sector gear portion of the bracket to move the bracket from a first position to a second position to move the second pivotable coupling from a primary position to a secondary position; and
   a mechanical lock disposed through the bracket and securable to a seat frame, wherein the mechanical lock is positionable in an engaged position and in a disengaged position, wherein, when the mechanical lock is positioned in the engaged position, the bracket is negligibly rotatable about the first pivotable coupling.

2. The vehicle seating assembly of claim 1, wherein, when the mechanical lock is positioned in the disengaged position, the bracket is rotatable about the first pivotable coupling between a first position of the bracket and a second position of the bracket.

3. The vehicle seating assembly of claim 2, wherein the mechanical lock includes a pin disposed through an opening in the bracket.

4. The vehicle seating assembly of claim 1, wherein, when the bracket is in the first position and the second pivotable coupling is in the primary position, then the seatback is positionable in a substantially upright position.

5. The vehicle seating assembly of claim 4, wherein, when the bracket is in the second position and the second pivotable coupling is in the secondary position, then the seatback is positionable in a forward inclined position.

6. The vehicle seating assembly of claim 5, wherein, when the seatback is in the forward inclined position, then the seatback may be rotated about the second pivotable coupling between a forward inclined position and a substantially flat position.

7. The vehicle seating assembly of claim 6, wherein, in the substantially flat position, the seatback is disposed over the seat.

8. The vehicle seating assembly of claim 1, wherein the first pivotable coupling extends through a first end of the bracket and is secured to a seat frame, and wherein the second pivotable coupling extends through a second end of the bracket and is secured to a seatback frame.

9. The vehicle seating assembly of claim 1, wherein a toothed interface between the spur gear and the sector gear portion defines a primary locking mechanism for retaining the bracket in the first position.

10. The vehicle seating assembly of claim 9, wherein the mechanical lock defines a secondary locking mechanism for retaining the bracket in the first position.

11. A vehicle seating assembly, comprising:
    a bracket extending along a side of a seat frame and including:
       a first pivotable coupling disposed between the bracket and the seat frame and defining a first axis; and
       a second pivotable coupling disposed between the bracket and a seatback frame and defining a second axis; and
    a lift mechanism disposed between a seat and a seatback for moving the bracket between a first position and a second position thereby moving the second pivotable coupling from a first height to a second height, wherein the seatback is movable between a forward inclined position and a substantially flat position when the second pivotable coupling is at the second height.

12. The vehicle seating assembly of claim 11, wherein the lift mechanism includes a spur gear that rotates along a toothed portion disposed on the bracket to move the bracket between the first position and the second position.

13. The vehicle seating assembly of claim 12, further comprising:
    a locking mechanism for maintaining the bracket in the first position, wherein, when the locking mechanism is released, the spur gear is rotatable along teeth disposed on the bracket to move the bracket from the first position to the second position.

14. The vehicle seating assembly of claim 11, wherein a forward portion of the seating assembly includes a mounting bracket and a B-bracket that define a third pivotable coupling about which the vehicle seating assembly is rotatable between a sitting position and a standing position.

15. The vehicle seating assembly of claim 14, wherein the mounting bracket is fixedly coupled to a rail slidable along a track assembly in the vehicle floor.

16. The vehicle seating assembly of claim 15, wherein the locking mechanism includes a cable-actuated pin.

17. A seating assembly, comprising:
    a seat;
    a seatback;
    a first axis defined by a pivotable coupling between a bracket and the seat;
    a second axis defined by a pivotable coupling between the bracket and the seatback;
    a third axis defined by a pivotable coupling between the seat frame and a mounting bracket proximate a floor; and wherein the bracket is rotatable about the first axis to move the seatback from a substantially upright position to a forward inclined position, wherein the seatback is rotatable around the second axis to move the seatback from a forward inclined position to a substantially flat position, and wherein the seating assembly is pivotable about the third axis to move the seating assembly from the sitting position to the standing position when the seatback is in the substantially upright position.

18. The seating assembly of claim 17, wherein the mounting bracket is fixedly coupled to a rail disposed in a track assembly, and wherein the rail is slidable in the track assembly.

\* \* \* \* \*